United States Patent [19]

Kemp et al.

[11] Patent Number: 4,884,925
[45] Date of Patent: Dec. 5, 1989

[54] APPARATUS AND METHOD FOR TRANSFER AND SLURRYING OR DISSOLVING HYDRATABLE DRY BULK CHEMICALS

[75] Inventors: Robert A. Kemp, Syracuse; William I. Nelson, Baldwinsville; Gary W. Foley, Syracuse, all of N.Y.

[73] Assignee: General Chemical Corporation, Parsippany, N.Y.

[21] Appl. No.: 128,720

[22] Filed: Dec. 4, 1987

[51] Int. Cl.$^4$ .................. B65G 53/30; B65G 53/38; B65G 53/40; B65G 53/58
[52] U.S. Cl. ................ 406/109; 406/144; 406/153; 406/106; 406/137; 406/49; 366/165
[58] Field of Search .................. 406/46–49, 406/93–98, 41, 91, 106, 109, 124, 137, 139, 144–146, 151–153, 194, 197; 417/160, 151; 137/238, 240, 241; 134/166 C, 166 R; 366/165

[56] References Cited

U.S. PATENT DOCUMENTS

| | | | |
|---|---|---|---|
| 1,091,251 | 3/1914 | Stauffer | 406/197 |
| 1,185,156 | 5/1916 | Wood | 406/94 |
| 1,892,920 | 1/1933 | Weiss | 406/194 |
| 1,943,780 | 1/1934 | Allen | 406/194 X |
| 2,005,800 | 6/1935 | O'Boyle | 406/144 X |
| 2,430,278 | 11/1947 | Daniels | 406/137 X |
| 2,617,690 | 11/1952 | Addison | 406/194 X |
| 2,673,125 | 3/1954 | Squire, Jr. | 406/194 X |
| 3,186,769 | 6/1965 | Howlett, Jr. | 406/153 |
| 3,314,730 | 4/1967 | Anderson et al. | 406/49 |
| 4,005,806 | 2/1977 | Balwin | 406/144 X |
| 4,016,894 | 4/1977 | Baldwin et al. | 137/13 |
| 4,499,561 | 2/1985 | Mason et al. | 366/165 X |

FOREIGN PATENT DOCUMENTS

| | | | |
|---|---|---|---|
| 236072 | 10/1960 | Australia | 406/132 |
| 419531 | 10/1925 | Fed. Rep. of Germany | 406/144 |
| 1148185 | 5/1963 | Fed. Rep. of Germany | 406/153 |
| 2153410 | 5/1973 | France . | |
| 155120 | 12/1981 | Japan | 406/151 |
| 593991 | 2/1978 | U.S.S.R. | 406/137 |
| 709475 | 1/1980 | U.S.S.R. | 406/109 |
| 1347614 | 2/1974 | United Kingdom . | |
| 2180957 | 4/1987 | United Kingdom | 406/152 |

Primary Examiner—Sherman D. Basinger
Assistant Examiner—James M. Kannofsky
Attorney, Agent, or Firm—Brumbaugh, Graves, Donohue & Raymond

[57] ABSTRACT

An apparatus for the transfer of a dry chemical is formed having a sealed solvation hopper positioned between a liquid driven eductor and a fitting for connection to a storage container, e.g. a railcar. At the inlet end of the solvation hopper is a chemical inlet pipe which connects the interior to the exterior of the hopper. Surrounding the chemical inlet pipe are a plurality of nozzles for the introduction of solvation liquid into the hopper. The nozzles are disposed such that the solvation liquid washes the interior surface of the hopper to prevent plugging by hydrates (solvates) which may be formed. At the outlet end of the hopper, the hopper is connected to the suction opening of a liquid eductor. In use, the exterior end of the chemical inlet pipe is connected to the dry chemical storage container. Liquid flowing through the liquid eductor creates a suction and draws dry chemical out of the storage container and into the hopper. In the hopper, solvation liquid is supplied through the nozzles to wet the dry chemical and to wash the surfaces of the hopper, pushing the wetted material toward the outlet end of the hopper. At the outlet end of the hopper, the wetted material is sucked out into the eductor where it is combined with the flow of eductor liquid. The material leaving the eductor is recovered and sent either to storage or directly for processing.

8 Claims, 3 Drawing Sheets

APPARATUS AND METHOD FOR TRANSFER AND SLURRYING OR DISSOLVING HYDRATABLE DRY BULK CHEMICALS

BACKGROUND OF THE INVENTION

This application relates to an apparatus and method for transferring dry chemicals from a container, such as a railcar, and forming a solution or slurry of the chemical in a liquid carrier medium. The invention is particularly suitable for use with chemicals which form hydrates, in particular soda ash, and which therefore are difficult to handle using known transfer means.

Various means have been described for transferring dry materials out of containers. For example, U.S. Pat. No. 3,512,842 describes a method for unloading railcars in which a slurry is formed inside the railcar and then is pumped out. Such a process has numerous drawbacks, however, including the risk of overflowing or foaming within the car; the need for specialized railcars adapted for use in the slurrying process; the possibility of corrosive solutions being formed and damaging the railcar; problems with residual moisture causing caking in subsequent shipments; and the formation of hard, slowly dissolving lumps when liquid is added to a large quantity of solid. A similar approach is described in U.S. Pat. No. 4,189,262.

Eductors have been used and are still used to transfer dry chemicals as a slurry, solution or solid. For example, liquid driven eductors have been used to slurry dry polymers and activated carbon in the water treatment industry and to transfer fly ash in the electric power industry. Also air, steam, and liquid driven eductors have been used for transfer of solids. However, problems are known to exist with eductor-based handling systems.

For example, air driven eductors require a high power input and air flow per unit mass of solid conveyed resulting in high energy costs and higher capital cost for dust collection equipment. Steam driven eductors are used to create a vacuum for pneumatic conveying of dry solids to a solid-liquid mixing apparatus. The systems using steam driven eductors which are known to the inventors require a large amount of support equipment including a barometric leg for condensing the steam with modifications for solid-liquid mixing, and a large steam supply. Since the solid is conveyed by vacuum, the steam driven eductor system is limited by economics to installations where it can be located near, e.g. within a few hundred feet of, the container of dry chemical.

Liquid driven eductors do not require large volumes of air or steam and can be used to transfer dry chemicals from a container, such as a railcar, forming a solution or slurry of the chemical in the liquid carrier medium. Liquid driven eductors are known to be successfully used to prepare dilute solutions of polymer in water as well as to transfer insoluble materials, e.g. activated carbon, to storage as a slurry. However, the inventors are unaware of any liquid-driven eductor system used to transfer and dissolve or slurry dry hydratable solids when the motive liquid is a concentrated solution of the solid being transferred. In tests using concentrated solutions of a dry hydratable solid (i.e. soda ash) as the motive fluid to convey said solid, the throat of the eductor rapidly plugged with hydrates making frequent cleaning necessary. Also, tests using water as the motive fluid to convey a hydratable solid (e.g. soda ash) showed that plugging of the eductor occurred making cleaning necessary.

It is an object of the present invention to provide an apparatus and method for transferring solids, and particularly hydratable dry chemicals from a storage container, which avoids the plugging problems associated with known eductor systems. It is a further object of the invention to achieve this goal using a simple apparatus which is readily used in concert with conventional railcars.

SUMMARY OF THE INVENTION

According to the invention, an apparatus for the transfer of a dry chemical is formed having a sealed solvation hopper positioned between a liquid driven eductor and a fitting for connection to a storage container, e.g. a railcar. At the inlet end of the solvation hopper is a chemical inlet pipe which connects the interior to the exterior of the hopper. Surrounding the chemical inlet pipe are a plurality of nozzles for the introduction of solvation liquid into the hopper. The nozzles are disposed such that the solvation liquid washes the interior surface of the hopper to prevent plugging by hydrates (solvates) which may be formed. At the outlet end of the hopper, the hopper is connected to the suction opening of a liquid driven eductor.

In use, the exterior end of the chemical inlet pipe is connected to the dry chemical storage container. Liquid flowing through the eductor creates a suction and draws dry chemical out of the storage container and into the hopper. In the hopper, solvation liquid is supplied through the nozzles to wet the dry chemical and to wash the surfaces of the hopper, pushing the wetted material toward the outlet end of the hopper. At the outlet end of the hopper, the wetted material is sucked out into the eductor where it is combined with the flow of eductor liquid. The material leaving the eductor is recovered and sent either to storage or directly for processing.

DETAILED DESCRIPTION OF THE INVENTION

Figure 2:
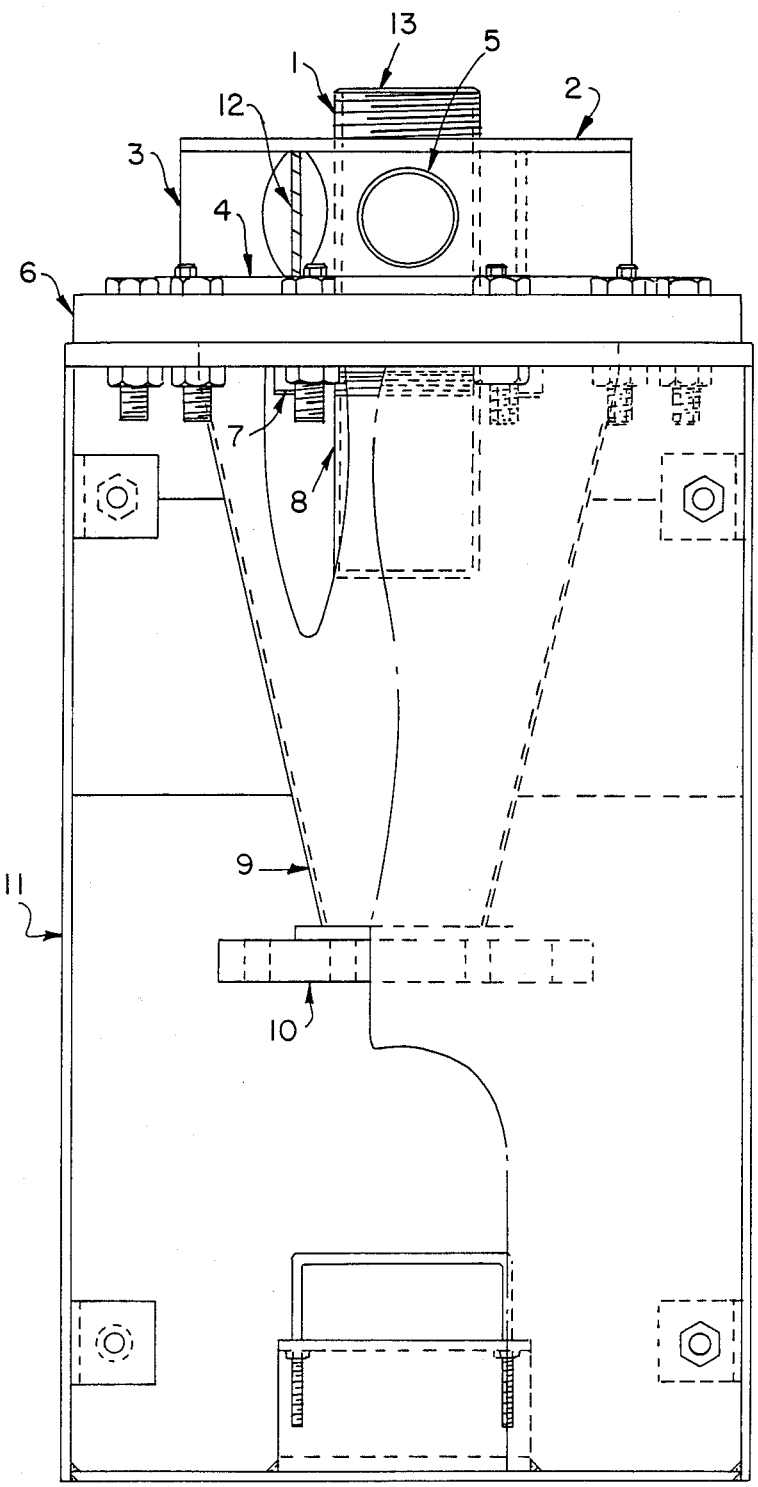
FIG. 2 is an assembly drawing of the same apparatus shown without the eductor.

Looking at FIG. 2, the apparatus of the invention comprises a solvation hopper formed from a wall member 9 and an inlet end member 6. The chemical inlet pipe 13 passes through the inlet end member 6 to provide a connection between the interior and the exterior of the hopper.

The portion of the dry chemical inlet pipe interior to the solvation hopper is not intentionally wetted with solvation liquid because it is difficult to prevent zones of quiescent liquid from forming on the pipe. For example, if the outer wall of said pipe is wetted, the liquid is relatively quiescent at the end of the pipe and on the inner wall where capillary action draws the liquid. Hydrates can accumulate in these quiescent zones causing plugging. The portion of the dry chemical inlet pipe interior to the solvation hopper may, however, be unintentionally wetted by spray from the hopper and eductor and for this reason is preferably coated with or constructed from a non-stick material having a low coefficient of friction such as polytetrafluoroethylene (i.e. Teflon ® PTFE). The portion of the dry chemical inlet pipe exterior to the solvation hopper may be constructed of a material chosen for strength (e.g. metal) as this portion of the inlet pipe is not susceptible to plug formation, or it can be made of the same material as the interior portion. Thus, the solvation hopper formed from wall member 9 and inlet end member 6 and the exterior portion 1 of the chemical inlet pipe 13 are advantageously constructed from materials chosen for strength, e.g. metal, and the interior end 8 of the chemical inlet pipe 13 is preferably constructed from or coated with a material chosen for its low coefficient of friction, e.g. polytetrafluoroethylene.

The exterior end 1 of the chemical inlet pipe 13 has means for connecting the inlet pipe to a conduit for transporting solids to the apparatus of the invention. FIG. 2 shows the means for connecting the inlet pipe to said conduit as threaded but any type of connection, e.g. flanged, can be used.

Figure 1:
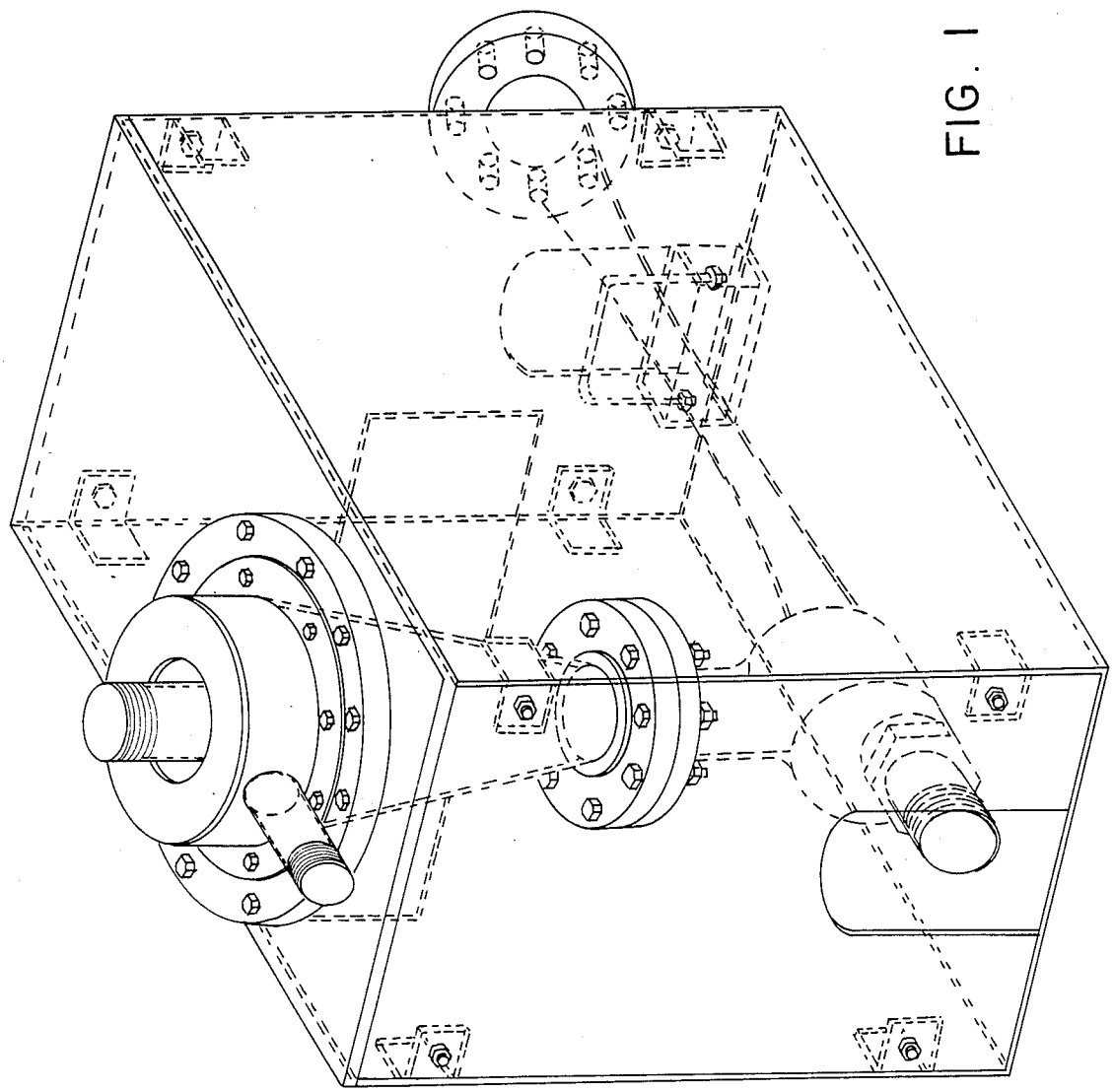
FIG. 1 is an isometric drawing of an apparatus according to one embodiment of the invention.

Surrounding the interior end 8 of the chemical inlet pipe 13 at the inlet end of the hopper are a plurality of nozzles 7 comprising downspouts fitted with commercially available liquid spray nozzles, e.g. Spraying Systems Company Veejet. The nozzles 7 convert the pressure energy of the solvation liquid into kinetic energy and are disposed to direct the solvation liquid to wash the solvation hopper wall member 9. In a preferred embodiment of the invention, the nozzles 7 are oriented at an angle of 45° below the horizontal and feed the solvation liquid so that said liquid enters approximately tangential to the solvation hopper wall member 9. In this manner a swirling action is created in the solvation hopper which ensures that all surfaces of the solvation hopper wall member 9 are washed with solvation liquid. The nozzles 7 are connected to a means for supplying the solvation liquid, for example, to an annular manifold. In FIG. 2 such a manifold is formed from item 2, an annular top, item 3, an annular outer wall, item 4, an annular bottom, item 5, a solvation liquid inlet, and item 12, an annular inner wall. FIG. 1 clearly shows the location and appearance of the manifold. The outlet end 10 of the hopper is connected to the suction opening of a liquid driven eductor as shown in FIG. 1.

Figure 3:
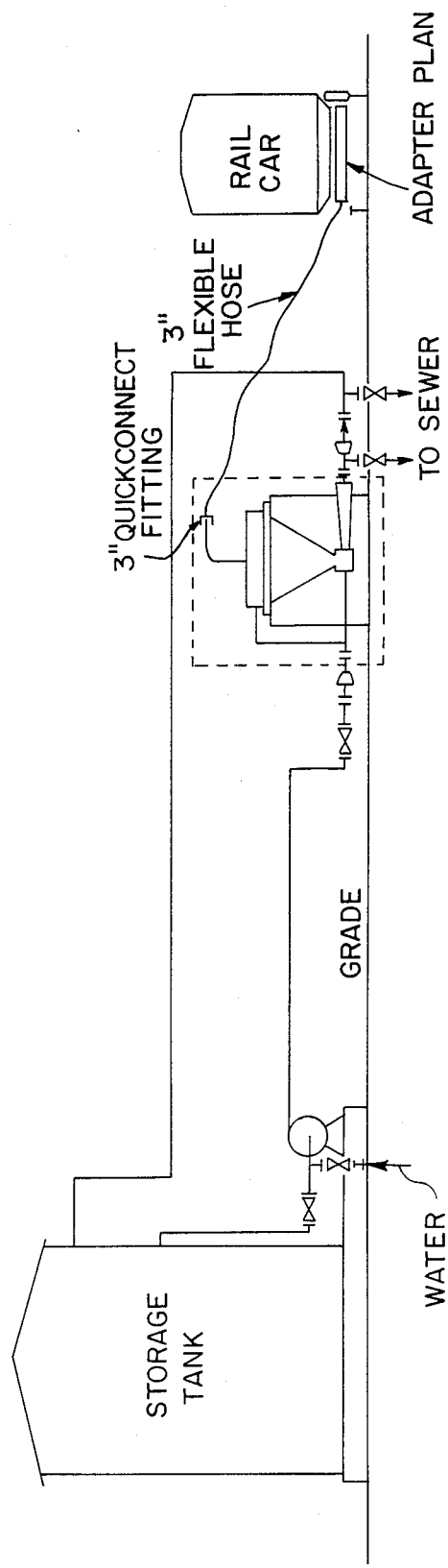
FIG. 3 is a piping diagram for an apparatus where the storage container is a railcar and the solution or slurry produced in the invention is sent to storage. In the example described by the piping diagram, solution of any concentration up to saturation and slurries of solid in saturated solutions of said solid may be prepared by using solution recycled from storage as the liquid for the eductor.

In a preferred embodiment, the same liquid is used as both the solvation liquid and to power the eductor. In this case, as shown in FIG. 3, a pipe connects the eductor's liquid inlet pipe to the manifold of items 2,3,4,5 and 12 of FIG. 2.

In use, the exterior end 1 of the chemical inlet pipe 13 is connected to one end of a conduit. The other end of said conduit terminates at a container of dry chemical in such a manner as to permit the dry chemical to enter the conduit. The conduit may be, for example, a flexible hose, formed from a material compatible with the chemical to be transported. Liquid is supplied through a pipe to an eductor which generates a vacuum in the hopper which draws dry chemical from a container, through the conduit, through the chemical inlet pipe 13 into the solvation hopper constructed of items 9 and 6, where it is mixed with solvation liquid from nozzles 7, and into the eductor. To obtain the most efficient utilization of the eductor, it should be located close to dry chemical storage container. In this manner, a high solid to air mass ratio, e.g. 100 can be obtained.

The solvation liquid is supplied through nozzles 7 from the annular manifold, which in the preferred embodiment of the invention receives liquid from the inlet side of the eductor. Nozzles 7 are chosen so that the volumetric flow rate of liquid entering the solvation hopper is controlled and is small compared to the suction capacity of the eductor chosen for use. FIG. 3 is a schematic diagram of the use just described.

As shown in FIG. 1, the solvation hopper may advantageously have a conical section tapering downward toward the outlet end. It may also be cylindrical, or have a curved section. Preferably, however, there will not be any ledges on the interior of the hopper which would impede movement of wetted material toward the outlet end of the hopper and which might promote plugging. Although it is particularly suited for use with hydratable materials such as soda ash or calcium chloride, the apparatus of the invention can advantageously be used to transport a wide variety of chemical materials, including nonhydratable chemicals such as sodium bicarbonate and insoluble materials such as sand.

It will be appreciated that the identity and flow rates of the solvation liquid and the eductor liquid, which can be the same of different, will be selected to optimize the transport process. Thus, the solvation liquid is preferably supplied at a rate sufficient to prevent plugging of the hopper, yet too high a rate is undesirable as this will reduce throughput of the transported chemical for any given flow rate of eductor liquid.

As part of the method of this invention empirical correlations are presented for proper sizing of the apparatus. These correlations are based on the suction capacity of the eductor chosen, expressed in actual cubic feet per minute, ACFM. Eductor manufacturers generally present suction capacity data in terms of standard cubic feet per minute, SCFM, of air. When expressed in this manner, the capacity of a given eductor is strongly related to the eductor inlet pressure, discharge pressure and vacuum. However, if the data supplied by manufacturers for capacity in SCFM are converted to ACFM, the eductor suction capacity is relatively independent of eductor vacuum. Selection of said eductor inlet pressure and a rough estimation of the required discharge head then establishes its suction capacity in ACFM. From this data, values for the transport rate of the dry solid, solvation liquid feed rate to the nozzles, and solvation hopper volume can be estimated.

Laboratory and field testing of example apparatuses indicate that the transport rate of solids can be expressed by Equation 1.

$$T = C \times D \times E \tag{1}$$

Where:
T = Solid transport rate, lb/min
C = Volume of solid per volume of eductor suction capacity
D = Solid bulk density, lb/ft$^3$
E = Eductor suction capacity, ACFM.

The value of "C" in the apparatus of this invention is usually 0.02 to 0.20 and more usually 0.05 to 0.10, and depends on the physical properties of the solid being transported. For example, free-flowing fine grained solids such as dense soda ash have a value of 0.085 while coarse material such as flake calcium chloride have a value of 0.07 in an example apparatus of this invention.

The quantity of solvation liquid required to ensure smooth operation depends on the size of the solvation hopper, e.g., the larger the solvation hopper the more surface area available for accumulation of hydrates; the orientation of nozzles; and on the dry chemical being handled. For nonhydratable dry chemicals such as activated carbon and sodium bicarbonate, smooth operation may be obtained without solvation liquid being supplied from nozzles, although it is preferred that a small quantity be provided to keep the wall member 9 of the solvation hopper clean. For hydratable dry chemicals, e.g. soda ash, handled with the apparatus of this invention, Equation 2 provides a relation for the estimation of flow rate of solvation liquid required when the solvation hopper is sized as described below.

$$Z = \text{Solvation Liquid Flow Rate, gal/lb Solid} = \frac{7.5\left(1 - \frac{\text{Solid Bulk Density, lbs/ft}^3}{156}\right)}{\text{Solid Bulk Density, lb/ft}^3} \quad (2)$$

The required flow rate of solvation liquid fed to nozzles 7 will be in the range of 0.10 to 4 times the quantity "Z" and preferably in the range of 0.5 to 2 times the quantity "Z". Equation 2 and Equation 1, therefore, together determine the flow rate of said liquid. In this regard, low pressure at nozzles 7, e.g. 60 PSIG or less, will require flow rates on the high side of the range and high pressure at nozzles 7, e.g. 140 PSIG or more, will require flow rates on the low side of the range.

The solvation hopper formed by wall member 9 and inlet end member 6 should have a volume such that the nominal residence time of the solvation liquid in the hopper, i.e. the volume of the hopper divided by the solvation liquid flow rate, is from 0.5 to 30 seconds and preferably in the range of 0.5 to 10 seconds.

The solvation liquid and the eductor liquid are selected for compatibility with the transported chemical and the intended use of the chemical. In many cases, just a solvent, for example water, can be used as both liquids. If a slurry of a soluble chemical is desired on the other hand, it may be advantageous to employ a saturated solution of the chemical as the solvation liquid, the eductor liquid, or both.

The conduit from the apparatus to the dry chemical container may be any diameter hose, pipe or tubing but is preferably of the same diameter as the eductor suction fitting.

The following examples demonstrate the utility of the invention for transporting soda ash and calcium chloride using water or saturated solutions. These examples illustrate the adjustment of various process parameters for a single system, and should not be considered to limit the scope of the invention to particular chemicals, solvation liquids, or eductor liquids.

EXAMPLE #1

A laboratory scale apparatus using a 1″ eductor for vacuum development was used to pull soda ash from a storage hopper, pneumatically convey the soda ash to the solvation hopper of an apparatus according to the invention, hydrate the soda ash, and transfer the resulting solution and slurry to a storage tank. The apparatus used had a solvation hopper volume of ⅛ gallon and a one-inch diameter inlet pipe. Two nozzles were used to supply solvation liquid to the solvation hopper in a tangential manner.

Conditions of operation were as follows:

| | |
|---|---|
| Eductor Suction capacity | 2.8 ACFM at conditions stated |
| Eductor Liquid | Saturated Soda Ash Solution |
| Motive Pressure | 60 PSIG |
| Apparatus Discharge Pressure | 5 PSIG |
| Eductor Liquid Flow | 9 gpm |
| Solvation Liquid Flow | 1.7 gpm (0.11 gal/lb solid) |
| Soda Ash Handling Rate | 15.2 lbs/min (0.45 ton/hour) |
| Soda Ash Bulk Density | 64 lbs/ft$^3$ |

The apparatus and operating conditions provided smooth operation without adverse hydration and plugging of the system.

EXAMPLE #2

The apparatus described in Example #1 was used to pull soda ash from a hopper, pneumatically convey the soda ash to the apparatus, hydrate the soda ash, and transfer the resulting solution and slurry to a storage tank. Conditions of operation were as follows:

| | |
|---|---|
| Eductor Suction Capacity | 3.3-ACFM at conditions stated |
| Eductor Liquid | Saturated Soda Ash Solution |
| Motive Pressure | 60 PSIG |
| Apparatus Discharge Pressure | 3 PSIG |
| Eductor Liquid Flow | 9 gpm |
| Solvation Liquid Flow | < 1 gpm |
| Soda Ash Handling Rate | — |
| Soda Ash Bulk Density | 64 lbs/ft$^3$ |

In this example the low solvation liquid flow caused the apparatus to plug with hydrated soda ash. Cleaning of the apparatus made determination of the soda ash handling rate meaningless.

This example demonstrates the need for solvation liquid flow within the range of the invention.

EXAMPLE #3

A laboratory scale apparatus using a 1½″ eductor for vacuum development was used to pull soda ash from a storage hopper, pneumatically convey the soda ash to an apparatus according to the invention, hydrate and dissolve the soda ash, and transfer the resulting solution and slurry to a storage tank. The apparatus used had a solvation hopper volume of ¼ gallon and a one-inch diameter inlet pipe. Two nozzles were used to supply solvation liquid to the solvation hopper in a tangential manner. Conditions of operation were as follows:

| | |
|---|---|
| Eductor Suction Capacity | 7.0 ACFM at conditions stated |
| Eductor Liquid | Water |
| Motive Pressure | 40 PSIG |
| Apparatus Discharge Pressure | 3 PSIG |
| Eductor Liquid Flow | 23 gpm |
| Solvation Liquid Flow | 2 gpm (0.049 gal/lb solid) |
| Soda Ash Handling Rate | 41 lbs/min (1.23 tons/hour) |
| Soda Ash Bulk Density | 64 lbs/ft$^3$ |

The apparatus and operating conditions provided smooth operation without adverse hydration and plugging of the system. This example demonstrate that the apparatus can be operated with water as well as saturated solutions of the chemicals (demonstrated in Example #1).

EXAMPLE #4

The apparatus described in Example #3 was used to pull soda ash from a hopper, pneumatically convey the soda ash to the apparatus, hydrate the soda ash, and transfer the resulting solution and slurry to a storage tank. Conditions of operation were as follows:

| | |
|---|---|
| Eductor Suction Capacity | 8.0 ACFM at conditions stated |
| Eductor Liquid | Saturated Soda Ash Solution |
| Motive Pressure | 49 PSIG |
| Apparatus Discharge Pressure | 3 PSIG |
| Eductor Liquid Flow | 24 gpm |
| Solvation Liquid Flow | 4 gpm (0.10 gal/lb solid) |
| Soda Ash Handling Rate | 38 lbs/min (1.1 tons/hour) |
| Soda Ash Bulk Density | 64 lbs/ft$^3$ |

The apparatus and operating conditions provided smooth operation without adverse hydration and plugging of the system.

EXAMPLE #5

A large scale apparatus using a 3 inch eductor for vacuum development was used to pull soda ash from a railcar, pneumatically convey the soda ash to an apparatus according to the invention, hydrate and dissolve the soda ash, and transfer the resulting solution and slurry to a holding pond. The apparatus used had a solvation hopper volume of 2 gallons and a three-inch diameter inlet pipe. Four nozzles, disposed at an angle of 45° below horizontal, were used to supply solvation liquid to the solvation hopper in a tangential manner.

Conditions of operation were as follows:

| | |
|---|---|
| Eductor Suction Capacity | 65 ACFM at conditions stated |
| Motive Liquid | water |
| Motive Pressure | 100 PSIG |
| Apparatus Discharge Pressure | 10 PSIG |
| Eductor Liquid Flow | 200 gpm |
| Solvation Liquid Flow | 20 gpm (0.05 gal/lb solid) |
| Soda Ash Handling Rate | 400 lbs/min (12 tons/hour) |
| Soda Ash Bulk Density | 64 lbs/ft$^3$ |

The apparatus and operating conditions provided smooth operation without adverse hydration and plugging of the system. This example demonstrates the feasibility of unloading railcars of hydratable chemicals and transferring slurries and/or solutions of said chemicals to storage.

EXAMPLE #6

The apparatus of Example #5 was used to pull flake calcium chloride from a railcar, pneumatically convey the calcium chloride to an apparatus according to the invention, hydrate and dissolve the calcium chloride and transfer the resulting solution through approximately 250 feet of 4 inch piping to a storage tank. Conditions of operation were as follows:

| | |
|---|---|
| Eductor Suction Capacity | 71 ACFM at Conditions Stated |
| Motive Liquid | Water |
| Motive Pressure | 140 PSIG |
| Apparatus Discharge Pressure | 25 PSIG |
| Eductor Liquid Flow | 230 gpm |
| Solvation Liquid Flow | 34 gpm (0.126 gal/lb solid) |
| Calcium Chloride Handling Rate | 270 lbs/min (8 tons/hour) |
| Calcium Chloride Bulk Density | 55 lbs/ft$^3$ |

The apparatus and operating conditions provided smooth operation without adverse hydration and plugging of the system. Samples taken at locations along the discharge piping indicated that complete dissolution of the flake occurred in five seconds or less after the solvation liquid and solids exited the apparatus. This example demonstrates the feasibility of unloading railcars of hydratable chemicals and of transferring solutions of said chemicals to storage.

The trial runs using pilot and full scale systems described in the Examples demonstrate the ability of the apparatus and method according to the invention to effectively transport and hydrate, slurry and/or dissolve a dry hydratable chemical without plugging problems. The simple nature of the apparatus facilitates easy and inexpensive installation. Furthermore, the apparatus can be used to remove dry material from essentially any storage container without requiring more than a compatible connecting device. Thus, the method of the apparatus is substantially superior to existing methods for unloading railcars which may require the construction of special structures or the digging of a pit under the track.

In the course of the trial runs it was also found that not all of the surfaces within the hopper were readily washed by flow from the nozzles. In particular, the chemical inlet pipe proved difficult to adequately wash with solvation liquid, although it was wetted. For this reason, hydrates tended to build up on the inlet pipe and cause plugging.

To overcome this problem one could in principle incorporate more nozzles oriented in appropriate directions. We, however, have found that it is preferable to utilize a non-stick material, such as polytetrafluoroethylene, in fabricating at least the exposed surfaces of the inlet pipe. The use of similar materials in fabricating the remainder of the hopper does not appear to be economically justifiable, since the nozzles are effective and since the non-stick material may be prone to abrasion.

We claim:

1. A method for transporting a dry chemical out of a container and introducing the dry chemical into a liquid carrier medium comprising:
   (a) connecting to the container an apparatus comprising a solvation hopper formed from a wall member, and an inlet end member and having an outlet end opposite to the inlet end; a plurality of spray nozzles disposed in the inlet end member of the hopper; means for supplying a flow of solvation liquid to the spray nozzles; a chemical inlet pipe passing through the inlet end member so as to connect the interior and the exterior of the hopper; and a liquid driven eductor having a liquid inlet pipe, a liquid outlet pipe and a suction opening, said suction opening being attached to the outlet end of the hopper, wherein the hopper is a sealed unit such that liquid flow through the eductor generates a suction within the chemical inlet pipe, and wherein the spray nozzles are oriented such that solvation liquid flowing through the spray nozzles washes the interior surface of the all member;
   (b) supplying a flow of eductor liquid to the liquid driven eductor so as to such the dry chemical from the container into the hopper;

(c) supplying a flow of solvation liquid to the spray nozzles such that the dry chemical in the hopper is mixed with the solvation liquid to form wetted chemical which is sucked out of the hopper through the suction opening of the eductor; and (d) recovering the chemical in a liquid carrier medium from the eductor outlet pipe said carrier medium comprising a combination of the solvation liquid and the eductor liquid, wherein the solvation liquid is supplied in an amount of 0.1 to 4 times the quantity "Z", where "Z" is the solvation flow rate expressed as gal/lb of solid and $$Z = \frac{7.5\left(1 - \frac{\text{Solid Bulk Density, lbs/ft}^3}{156}\right)}{\text{Solid Bulk Density, lb/ft}^3}.$$

2. The method according to claim 1, wherein the solvation liquid is supplied at a flow rate sufficient to prevent plugging of the hopper by the wetted chemical.

3. The method according to claim 2, wherein the dry chemical is soda ash or calcium chloride, and the solvation liquid comprises water.

4. The method according to claim 1, wherein the container is a railcar.

5. The method according to claim 4, wherein the solvation liquid is supplied in an amount of 0.5 to 2 times "Z", where $$Z = \frac{7.5\left(1 - \frac{\text{Solid Bulk Density, lbs/ft}^3}{156}\right)}{\text{Solid Bulk Density, lb/ft}^3}$$

6. A method according to claim 4, wherein the solvation liquid and/or eductor liquid comprises a saturated solution of the dry chemical being transported in a solvent.

7. The method according to claim 1, wherein the solvation hopper has a volume such that the nominal residence time of the solvation liquid in the solvation hopper is 0.5 to 30 seconds.

8. The method according to claim 1, wherein the solvation hopper has a volume such that the nominal residence time of the solvation liquid in the solvation hopper is 0.5 to 10 seconds.

* * * * *

UNITED STATES PATENT AND TRADEMARK OFFICE
CERTIFICATE OF CORRECTION

PATENT NO. : 4,884,925

DATED : DECEMBER 5, 1989

INVENTOR(S) : ROBERT ARTHUR KEMP ET AL.

It is certified that error appears in the above-identified patent and that said Letters Patent is hereby corrected as shown below:

First Page, Item 73, second line, "N.Y." should be --N.J.--.

Col. 4, line 29, "same of" should read --same or--.

Col. 5, line 2, "material" should read --materials--.

Col. 8, line 65, "all member" should read --wall member--.

Col. 8, line 67, "such" should read --suck--.

Signed and Sealed this

Twelfth Day of February, 1991

Attest:

HARRY F. MANBECK, JR.

Attesting Officer

Commissioner of Patents and Trademarks